US009423566B2

(12) United States Patent
Sugiyama

(10) Patent No.: US 9,423,566 B2
(45) Date of Patent: Aug. 23, 2016

(54) OPTICAL MODULATOR AND OPTICAL TRANSMITTER

(71) Applicant: Fujitsu Optical Components Limited, Kawasaki-shi, Kanagawa (JP)

(72) Inventor: Masaki Sugiyama, Sagamihara (JP)

(73) Assignee: FUJITSU OPTICAL COMPONENTS LIMITED, Kawasaki (JP)

( * ) Notice: Subject to any disclaimer, the term of this patent is extended or adjusted under 35 U.S.C. 154(b) by 0 days.

(21) Appl. No.: 14/049,584

(22) Filed: Oct. 9, 2013

(65) Prior Publication Data

US 2014/0153934 A1 Jun. 5, 2014

(30) Foreign Application Priority Data

Dec. 5, 2012 (JP) .................................. 2012-266813

(51) Int. Cl.
*H04B 10/50* (2013.01)
*G02B 6/293* (2006.01)
*G02F 1/035* (2006.01)
*G02F 1/21* (2006.01)

(52) U.S. Cl.
CPC ............ *G02B 6/29355* (2013.01); *G02F 1/035* (2013.01); *H04B 10/5053* (2013.01); *G02F 2001/212* (2013.01); *G02F 2201/58* (2013.01)

(58) Field of Classification Search
CPC .... H04B 10/50; H04B 10/501; H04B 10/508; H04B 10/516; H04B 10/58; H04B 10/588; H04B 10/5053; G02F 1/0305; G02F 1/0311; G02F 1/0316; G02F 1/0322; G02F 1/035; G02F 1/0356; G02B 6/29355
See application file for complete search history.

(56) References Cited

U.S. PATENT DOCUMENTS

| 5,347,601 A * | 9/1994 | Ade et al. ........................... 385/3 |
| 2002/0109893 A1* | 8/2002 | Givehchi ...................... 359/181 |
| 2004/0218868 A1* | 11/2004 | Liu ................................. 385/45 |
| 2005/0105848 A1* | 5/2005 | Yamada et al. ................. 385/31 |
| 2005/0220385 A1 | 10/2005 | Kawanishi et al. |
| 2009/0269017 A1* | 10/2009 | Maruyama et al. ........... 385/132 |
| 2010/0232737 A1* | 9/2010 | Sugiyama et al. ................ 385/2 |

FOREIGN PATENT DOCUMENTS

| JP | 2-165117 | 6/1990 |
| JP | 8-194195 | 7/1996 |

(Continued)

OTHER PUBLICATIONS

Japanese Office Action dated Jul. 5, 2016 in corresponding Japanese Patent Application No. 2012-266813, 3 pages.

*Primary Examiner* — Darren E Wolf
(74) *Attorney, Agent, or Firm* — Staas & Halsey LLP

(57) ABSTRACT

An optical modulator includes a Mach-Zehnder optical waveguide that includes a pair of parallel waveguides, and a two-input-one-output optical coupler that couples light output from the parallel waveguides; a branching waveguide that branches a portion of light output from the optical coupler; and a light receiving unit that receives the light output from the branching waveguide. Orientation of an output end of the branching waveguide is angled toward the light receiving unit, to be oblique with respect to the parallel waveguides, and orientation of an output end of the optical coupler is angled toward a side opposite to that of the output end of the branching waveguide, to be oblique with respect to the parallel waveguides.

6 Claims, 10 Drawing Sheets

(56) References Cited

FOREIGN PATENT DOCUMENTS

| JP | 2001-7002 | 1/2001 |
| JP | 2005-274806 | 10/2005 |
| JP | 2010-217427 | 9/2010 |
| JP | 2011-2640 | 1/2011 |

* cited by examiner

SINGLE-MODE PORTION

EMITTED
LIGHT

SINGLE-MODE PORTION

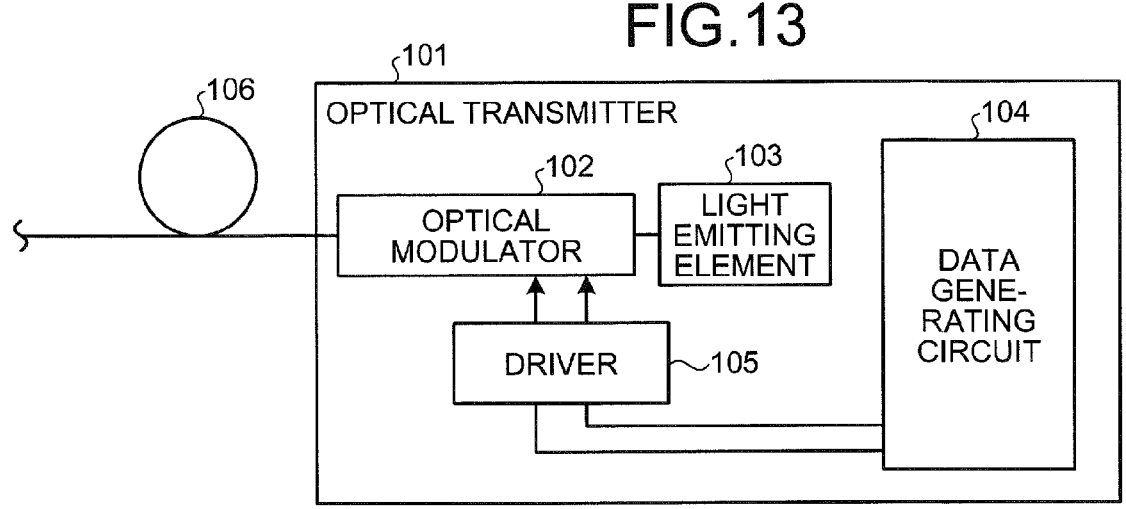

OPTICAL MODULATOR AND OPTICAL TRANSMITTER

CROSS REFERENCE TO RELATED APPLICATIONS

This application is based upon and claims the benefit of priority of the prior Japanese Patent Application No. 2012-266813, filed on Dec. 5, 2012, the entire contents of which are incorporated herein by reference.

FIELD

The embodiments discussed herein are related to optical modulator and an optical transmitter.

BACKGROUND

A conventional optical modulator modulates optical intensity using Mach-Zehnder interference. In such an optical modulator, a Mach-Zehnder optical waveguide has a pair of parallel waveguides between an optical branch and an optical coupler. A two-input-two-output X-coupler may be used as the optical coupler. In this case, light output from the pair of parallel waveguides is coupled by the X-coupler and the resulting light is further split into two branches. One of the branches output from the X-coupler may be used for monitoring to adjust the phase of the light, which varying according to a bias voltage applied to the pair of parallel waveguides (see, e.g., Japanese Laid-Open Patent Publication Nos. 2005-274806 and 2001-7002).

Use of an X-coupler as an optical coupler of the Mach-Zehnder optical waveguide invites increases in the size of the chip on which the Mach-Zehnder optical waveguide is fabricated. When a two-input-one-output Y-coupler, which is shorter than the X-coupler is used as the optical coupler, the size of the chip can be reduced compared to that of the chip using the X-coupler. However, when the Y-coupler is used as the optical coupler and a portion of the modulated light (on-light) output from the Mach-Zehnder optical waveguide is used as monitor light, light (off-light) is emitted from the optical coupler. When a photodiode for monitoring receives the emitted light from the optical coupler, a problem arises in that the extinction ratio of the monitor light of the optical modulator drops.

SUMMARY

According to an aspect of an embodiment, an optical modulator includes a Mach-Zehnder optical waveguide that includes a pair of parallel waveguides, and a two-input-one-output optical coupler that couples light output from the parallel waveguides; a branching waveguide that branches a portion of light output from the optical coupler; and a light receiving unit that receives the light output from the branching waveguide. Orientation of an output end of the branching waveguide is angled toward the light receiving unit, to be oblique with respect to the parallel waveguides, and orientation of an output end of the optical coupler is angled toward a side opposite to that of the output end of the branching waveguide, to be oblique with respect to the parallel waveguides.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 13 is a diagram of an example of an optical transmitter according to the embodiment.

DESCRIPTION OF EMBODIMENTS

Figure 1:
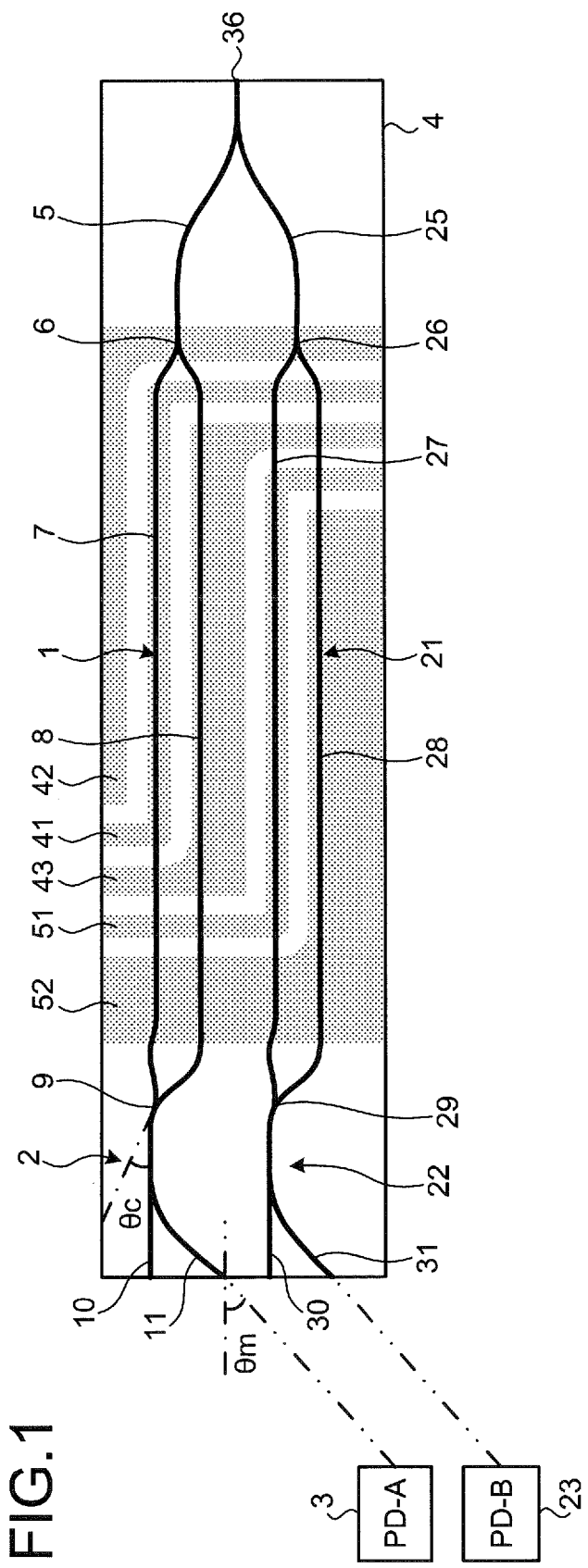
FIG. 1 is a diagram of a first example of an optical modulator according to an embodiment.

Embodiments of an optical modulator and optical transmitter will be described in detail with reference to the accompanying drawings. In the description of the embodiments, identical constituent elements are given the same reference numerals and redundant description is omitted.

FIG. 1 is a diagram of a first example of an optical modulator according to an embodiment. As depicted in FIG. 1, the optical modulator includes a first Mach-Zehnder optical waveguide 1, a first branching waveguide 2, and a first light receiving unit 3. In FIG. 1, the first light receiving unit 3 is denoted by "PD-A". The first Mach-Zehnder optical waveguide 1 and the branching waveguide 2 may be formed on, for example, a substrate 4 of an optical modulator chip.

The first Mach-Zehnder optical waveguide 1 includes a first input waveguide 5, a one-input-two-output first optical branch 6, a first and second parallel waveguides 7 and 8, and a two-input-one-output first optical coupler 9.

The first optical branch 6 is coupled to the first input waveguide 5. The first parallel waveguide 7 is coupled to one output end of the first optical branch 6. The second parallel waveguide 8 is coupled to the other output end of the first optical branch 6.

One input end of the first optical coupler 9 is coupled to the first parallel waveguide 7. The other input end of the first optical coupler 9 is coupled to the second parallel waveguide 8. The first and the second parallel waveguides 7 and 8 are disposed in parallel between the first optical branch 6 and the first optical coupler 9. The first and the second parallel waveguides 7 and 8 may be disposed, for example, parallel to each other in a longitudinal direction of the substrate 4.

The orientation of the output end of the first optical coupler 9 is inclined to be oblique against the first and the second parallel waveguides 7 and 8. In the example depicted in FIG. 1, the orientation of the output end of the first optical coupler 9 is inclined toward the upper long side of the substrate 4 in FIG. 1 forming an angle of "θc" that is greater than zero against the first and the second parallel waveguides 7 and 8. The orientation of the output end of the first optical coupler 9 may be the same as that of the direction of the bisector of the angle formed by a waveguide portion of the first optical coupler 9 connected to the first parallel waveguide 7 and a waveguide portion thereof connected to the second parallel waveguide 8.

The first branching waveguide 2 is connected to the output end of the first optical coupler 9. It is assumed that the output ratio of two branches output from the first branching waveguide 2 is a:[1−a]. "a" is a positive real number less than 0.5.

A waveguide 10 of the first branching waveguide 2 and having an output ratio of [1−a] (hereinafter, referred to as "first [1−a] output waveguide 10") may extend in, for example, a direction that is the same as that of the first and the second parallel waveguides 7 and 8. The first [1−a] output waveguide 10 may extend to an end of the substrate 4, for example, in FIG. 1, the left end.

A waveguide 11 of the first branching waveguide 2 and having output ratio value is "a" (hereinafter, referred to as "first [a] output waveguide 11") is angled to be oblique with respect to the first and the second parallel waveguides 7 and 8. In the example depicted in FIG. 1, the first [a] output waveguide 11 is angled toward the lower long side of the substrate 4 in FIG. 1 forming an angle of "θm" that is greater than zero with respect to the first and the second parallel waveguides 7 and 8.

The output end of the first optical coupler 9 and the first [a] output waveguide 11 are disposed to each be angled toward opposite sides, to be oblique with respect to the first and the second parallel waveguides 7 and 8. The first [a] output waveguide 11 may extend to an end of the substrate 4, for example, in FIG. 1, the left end.

The first light receiving unit 3 is disposed at a position enabling the first light receiving unit 3 to receive the light emitted from the first [a] output waveguide 11, that is, a position along an extended line of the first [a] output waveguide 11. A photodiode (PD) is an example of the first light receiving unit 3. In this embodiment, the first light receiving unit 3 is a photodiode.

The optical modulator may include plural optical modulating units that each includes the first Mach-Zehnder optical waveguide 1, the first branching waveguide 2, and the first light receiving unit 3. For example, in the example depicted in FIG. 1, the optical modulator includes two optical modulating units. The optical modulator may include three or more optical modulating units. The description below will be made assuming that the two optical modulating units are disposed in parallel to each other; and referring to one of the optical modulating units including the first Mach-Zehnder optical waveguide 1, the first branching waveguide 2, and the first light receiving unit 3 as "first optical modulating unit" and the other one as "second optical modulating unit".

The second optical modulating unit is similar to the first optical modulating unit and includes a second Mach-Zehnder optical waveguide 21, a second branching waveguide 22, and a second light receiving unit 23. In FIG. 1, the second light receiving unit 23 is denoted by "PD-B".

The first Mach-Zehnder optical waveguide 1, the first branching waveguide 2, and the first light receiving unit 3 in the above description for the first optical modulating unit will respectively be replaced by the second Mach-Zehnder optical waveguide 21, the second branching waveguide 22, and the second light receiving unit 23 to be read for the second optical modulating unit. The first input waveguide 5, the first optical branch 6, the first and the second parallel waveguides 7 and 8, and the first optical coupler 9 will respectively be replaced by a second input waveguide 25, a second optical branch 26, a third and a fourth parallel waveguides 27 and 28, and a second optical coupler 29 to be read therefor.

The first output−[1−a] and the first [a] output waveguides 10 and 11 will respectively be replaced by a second output−[1−a] and a second [a] output waveguides 30 and 31 to be read therefor. The second output−[1−a] and the second [a] output waveguides 30 and 31 respectively are the waveguides whose output ratio values are [1−a] and "a", of the second branching waveguide 22.

In each of the optical modulating units, the parallel waveguides 7, 8, 27, and 28 of the Mach-Zehnder optical waveguides 1 and 21 may be disposed in parallel to each other on the substrate 4. A one-input-two-output input optical branch 36 may be disposed at an end of the substrate 4, for example, the right end thereof in FIG. 1. An input end of the input optical branch 36 may be connected to, for example, an optical fiber through a connector not depicted.

One output end of the input optical branch 36 may be connected to the first input waveguide 5 of the first Mach-Zehnder optical waveguide 1. The other output end of the input optical branch 36 may be connected to the second input waveguide 25 of the second Mach-Zehnder optical waveguide 21. The output ratio of the light from the input optical branch 36 may be, for example, 1:1.

The substrate 4 may be, for example, a Z-cut crystal substrate having an electro-optical effect and made from, for example, $LiNbO_3$ (hereinafter, abbreviated as "LN") or $LiTaO_2$. The optical waveguide device using the electro-optical crystal may be formed by forming an optical waveguide by forming a metal film such as Ti on a portion of the crystal substrate and causing the film to thermally diffuse and exchanging protons in benzoic acid after patterning; and by disposing electrodes in the vicinity of the optical waveguide.

In the first Mach-Zehnder optical waveguide 1, a first signal electrode 41 is disposed along the first parallel waveguide 7 and a ground electrode 43 is disposed along the second parallel waveguide 8. The first signal electrode 41 and the ground electrodes 42 and 43 sandwiching the first signal electrode 41 form a co-planar electrode.

In the second Mach-Zehnder optical waveguide 21, a second signal electrode 51 is disposed along the third parallel waveguide 27 and a ground electrode 52 is disposed along the fourth parallel waveguide 28. The second signal electrode 51, and the ground electrodes 52 and 43 sandwiching the second signal electrode 51 form a co-planar electrode.

When a Z-cut substrate is used as the substrate 4, the first signal electrode 41 is disposed right over the first parallel waveguide 7; the ground electrode 43 is disposed right over the second parallel waveguide 8; the second signal electrode 51 is disposed right over the third parallel waveguide 27; and the ground electrode 52 is disposed right over the fourth parallel waveguide 28. Thereby, variation of the refractive index caused by the electric field in the Z-direction can be used.

For example, a buffer layer made from $SiO_2$ and having a thickness of about 0.2 to 2 micrometer may be disposed between the electro-optical crystal, and the first and the second signal electrodes 41 and 51, and the ground electrodes 42, 43, and 52. Thereby, the light propagated in the first, the second, the third, and the fourth parallel waveguides 7, 8, 27, and 28 is prevented from being absorbed by the first signal electrode 41, the ground electrode 43, the second signal electrode 51, and the ground electrode 52.

The first signal electrode 41 is connected to the ground electrode 43 through a resistor (not depicted) and thereby, may be a traveling wave electrode. When an electrical signal of a micro wave corresponding to modulated data is applied to the first signal electrode 41, the refractive indexes of the first and the second parallel waveguides 7 and 8 vary consequent to the generated electric field, respectively to be $+\Delta n_1$ and $-\Delta n_2$. Thus, the phase difference varies between the first and the second parallel waveguides 7 and 8, and the signal light output from the first optical coupler 9 is intensity-modulated by Mach-Zehnder interference.

The second signal electrode 51 is connected to the ground electrode 52 through a resistor (not depicted) and thereby, may be a traveling wave electrode. When the electrical signal of the micro wave corresponding to the modulated data is applied to the second signal electrode 51, the refractive indexes of the third and the fourth parallel waveguides 27 and 28 vary consequent to the generated electric field, respectively to be $+\Delta n_3$ and $-\Delta n_4$. Thus, the phase difference varies between the third and the fourth parallel waveguides 27 and 28, and the signal light output from the second optical coupler 29 is intensity-modulated by Mach-Zehnder interference.

The effective refractive index of the micro wave can be controlled by varying the cross-sectional shape of each of the first and the second signal electrodes 41 and 51. Thereby, the speeds of the light and the micro wave can be matched with each other and high-speed optical responsiveness can be acquired.

Figure 2:
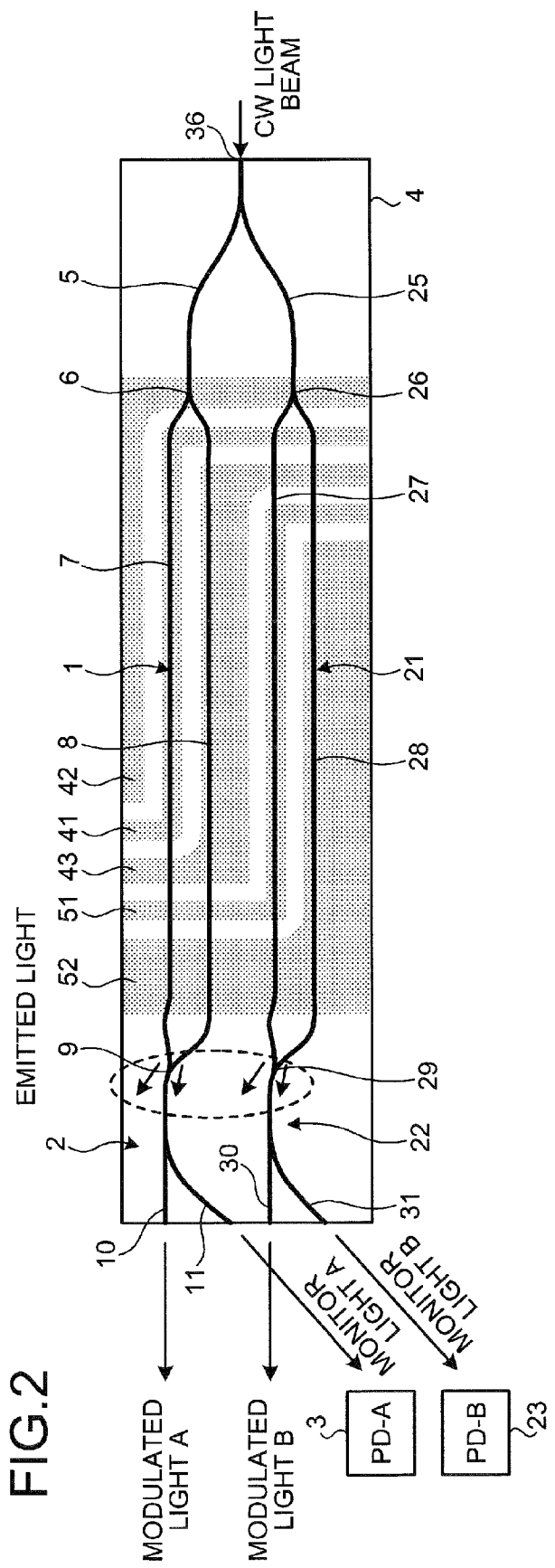
FIG. 2 is a diagram of the state of propagation of light in the optical modulator depicted in FIG. 1.

FIG. 2 is a diagram of the state of propagation of the light in the optical modulator depicted in FIG. 1. In FIG. 2, arrows indicate the directions for the light to travel. As depicted in FIG. 2, it is assumed that continuous wave (CW) light is input into the input end of the input optical branch 36. The light input from the input end of the input optical branch 36 is branched by the input optical branch 36 and the resulting branches of light are propagated in the first input waveguide 5 of the first Mach-Zehnder optical waveguide 1 and the second input waveguide 25 of the second Mach-Zehnder optical waveguide 21.

The light propagated in the first input waveguide 5 is branched by the first optical branch 6 and the resulting branches of light are propagated in the first and the second parallel waveguides 7 and 8, and are coupled by the first optical coupler 9. The first optical coupler 9 outputs modulated light whose optical intensity has been modulated by the Mach-Zehnder interference in the first Mach-Zehnder optical waveguide 1. The first optical coupler 9 emits emitted light.

The modulated light output from the first optical coupler 9 is output from the first [1−a] output waveguide 10 of the first branching waveguide 2. A portion of the modulated light is branched by the first branching waveguide 2 and one of the resulting branches of light is output as monitor light from the first [a] output waveguide 11. In FIG. 2, the modulated light output from the first [1−a] output waveguide 10 is labeled as "modulated light A" and the monitor light output from the first [a] output waveguide 11 is labeled as "monitor light A". The monitor light A is received by the first light receiving unit 3.

The light propagated in the second input waveguide 25 is branched by the second optical branch 26 and the resulting branches of light are propagated in the third and the fourth parallel waveguides 27 and 28, and coupled by the second optical coupler 29. The second optical coupler 29 outputs modulated light whose optical intensity has been modulated by the Mach-Zehnder interference in the second Mach-Zehnder optical waveguide 21. The second optical coupler 29 emits emitted light.

The modulated light output from the second optical coupler 29 is output from the second [1−a] output waveguide 30 of the second branching waveguide 22. A portion of the modulated light is branched by the second branching waveguide 22 and one of the resulting branches of light is output as monitor light from the second [a] output waveguide 31. In FIG. 2, the modulated light output from the second [1−a] output waveguide 30 is labeled as "modulated light B" and the monitor light output from the second [a] output waveguide 31 is labeled as "monitor light B". The monitor light B is received by the second light receiving unit 23.

In a modulator using the LN substrate, the off-voltage varies consequent to temperature variations. The first light receiving unit 3 may receive the monitor light A; a bias voltage corresponding to the power of the modulated light A may be superimposed on the electrical signal of the micro wave corresponding to the modulated data; and thereby, the phase of the reference light may be adjusted. The second light receiving unit 23 may receive the monitor light B; a bias voltage corresponding to the power of the modulated light B may be superimposed on the electrical signal of the micro wave corresponding to the modulated data; and thereby, the phase of the reference light may be adjusted.

The modulated light A and B respectively output from the first and the second [1−a] output waveguides 10 and 30 may be coupled such that the respective polarized waves are orthogonal to each other. Thereby, the optical modulator including the first and the second Mach-Zehnder optical waveguides 1 and 21 can be used as a dual polarization binary phase shift keying (DP-BPSK) modulator.

According to the optical modulator depicted in FIG. 1, the output ends of the first and the second optical couplers 9 and 29, and the first and the second [a] output waveguides 11 and 31 are angled toward opposite sides and thereby, the amount of emitted light that is emitted from the first and the second optical couplers 9 and 29 and that enters the first and the second light receiving units 3 and 23 is reduced. Therefore, in the optical modulator using the first and the second two-input-one-output optical couplers 9 and 29, the extinction ratio of each of the monitor lights is improved, enabling excellent extinction ratios of the monitor light to be achieved.

Figure 3:
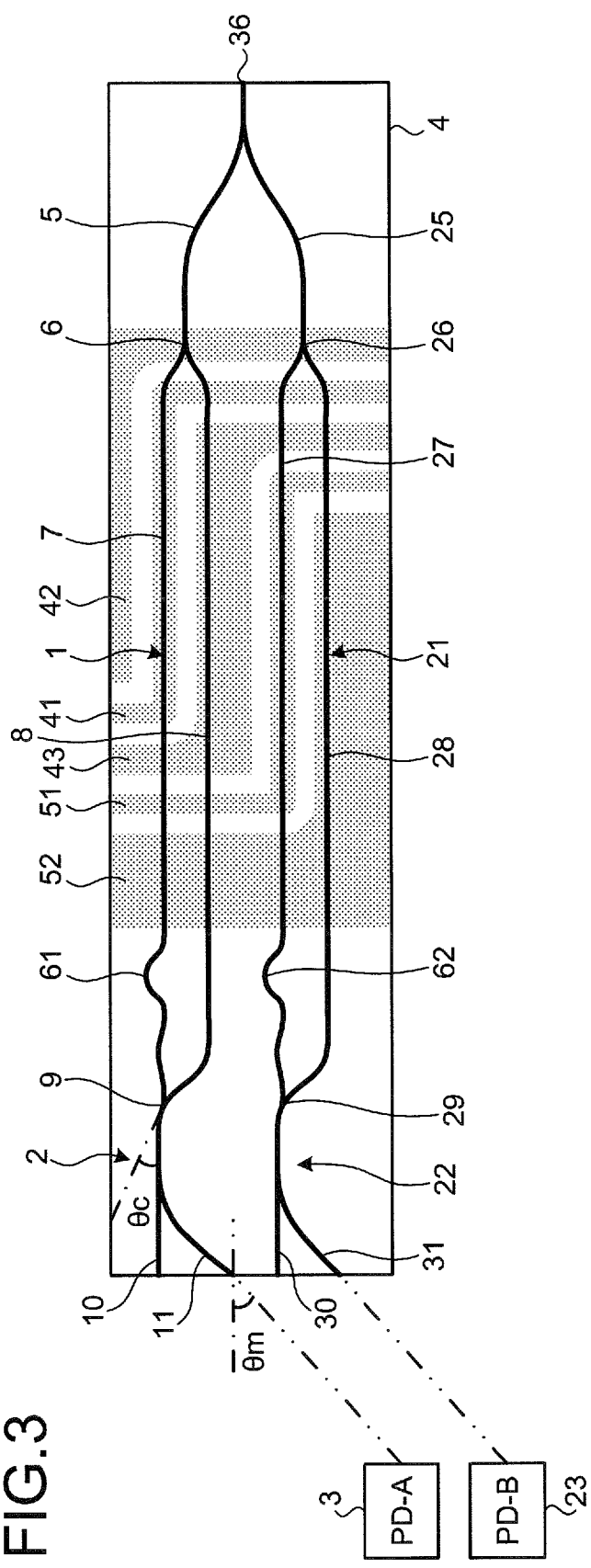
FIG. 3 is a diagram of a second example of the optical modulator according to the embodiment.

FIG. 3 is a diagram of a second example of the optical modulator according to the embodiment. The optical modulator depicted in FIG. 3 includes length correcting units 61 and 62 respectively included in one parallel waveguide of the first Mach-Zehnder optical waveguide 1 and in one parallel waveguide of the second Mach-Zehnder optical waveguide 21 in the optical modulator depicted in FIG. 1.

For example, in the example depicted in FIG. 1, in the first Mach-Zehnder optical waveguide 1, the output end of the first optical coupler 9 is angled to be oblique toward the first parallel waveguide 7 of the first and the second parallel waveguides 7 and 8. Therefore, in the first Mach-Zehnder optical waveguide 1, the waveguide on the side of the first parallel waveguide 7 is shorter than the waveguide on the side of the second parallel waveguide 8.

In the second Mach-Zehnder optical waveguide 21, the output end of the second optical coupler 29 is angled toward the third parallel waveguide 27 of the third and the fourth parallel waveguides 27 and 28. Therefore, in the second Mach-Zehnder optical waveguide 21, the waveguide on the side of the third parallel waveguide 27 is shorter than the waveguide on the side of the fourth parallel waveguide 28.

As depicted in FIG. 3, the first length correcting unit 61 having, for example, an S-shape is disposed along the first parallel waveguide 7 and thereby, the length of the first parallel waveguide 7 becomes longer than that in a case where the first length correcting unit 61 is not disposed. Thus, the length of the first parallel waveguide 7 can be set to be close to or equal to the length of the second parallel waveguide 8.

Similarly, the second length correcting unit 62 having, for example, an S-shape is disposed along the third parallel waveguide 27 and thereby, the length of the waveguide on the side of the third parallel waveguide 27 becomes longer than that in a case where the second length correcting unit 62 is not disposed. Thus, the length of the third parallel waveguide 27 can be set to be close to or equal to the length of the fourth parallel waveguide 28.

As depicted in FIG. 3, the first and the second length correcting units 61 and 62 may be disposed at positions at which no electrode is disposed. Preferably, the shape of each of the first and the second length correcting units 61 and 62 is the S-shape having a large radius of curvature, taking into consideration the suppression of optical loss. Other components of the second example are identical to those of the optical modulator depicted in FIG. 1, therefore, are given the same numerals used in FIG. 1, and will not again be described.

When the lengths of the two waveguides of the Mach-Zehnder optical waveguide differ from each other, the bias voltage acting as the reference may vary. Therefore, the lengths of the two waveguides of the Mach-Zehnder optical waveguide are preferably equal to each other. According to the optical modulator depicted in FIG. 3, the lengths of the two waveguides of each of the Mach-Zehnder optical waveguide are equal to each other or the difference therebetween is minimal. Thus, variation of the bias voltage acting as the reference can be suppressed.

Figure 4:
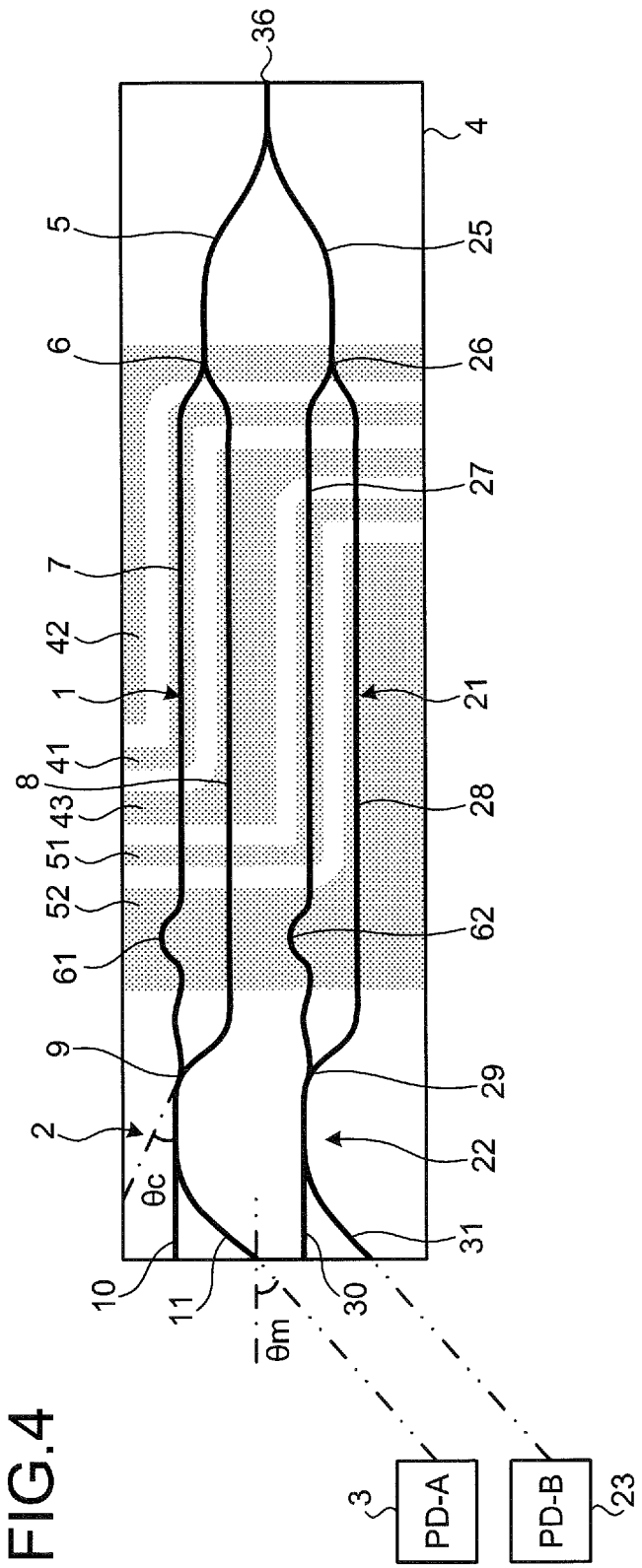
FIG. 4 is a diagram of a third example of the optical modulator according to the embodiment.

FIG. 4 is a diagram of a third example of the optical modulator according to the embodiment. Similar to the second example depicted in FIG. 3, the optical modulator depicted in FIG. 4 includes the length correcting units 61 and 62, which is disposed under the electrode in the optical modulator depicted in FIG. 1.

As depicted in FIG. 4, the first and the second length correcting units 61 and 62 may be disposed under the ground electrode 52 disposed near the first and the second optical couplers 9 and 29. The other components of the third example are identical to those of the optical modulator depicted in FIG. 1 or 3 and therefore, are given the same numerals used in FIGS. 1 and 3, and will not again be described.

According to the optical modulator depicted in FIG. 4, the size of the substrate 4 can be reduced compared to a case where the first and the second length correcting units 61 and 62 are disposed between the ground electrode 52, and the first and the second optical couplers 9 and 29. Therefore, the size of the optical modulator chip can be reduced.

Figure 5:
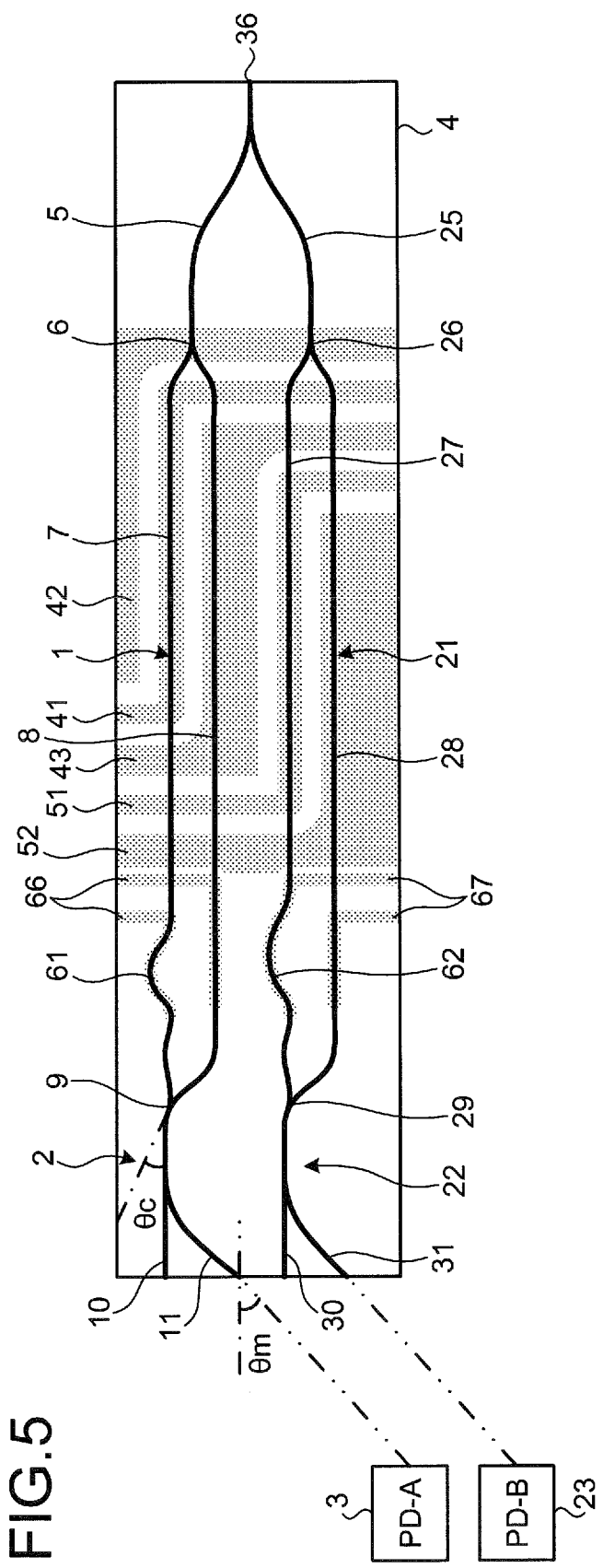
FIG. 5 is a diagram of a fourth example of the optical modulator according to the embodiment.

FIG. 5 is a diagram of a fourth example of the optical modulator according to the embodiment. The optical modulator depicted in FIG. 5 includes DC electrodes 66 and 67 to apply bias voltages to the first and the second Mach-Zehnder optical waveguides 1 and 21, and, similarly to the second example depicted in FIG. 3, includes the length correcting units 61 and 62 disposed under the DC electrodes 66 and 67, in the optical modulator depicted in FIG. 1.

As depicted in FIG. 5, the first length correcting unit 61 may be disposed under the first DC electrode 66, e.g., under a portion thereof disposed on the first parallel waveguide 7. The second length correcting unit 62 may be disposed under the second DC electrode 67, e.g., under a portion thereof disposed on the third parallel waveguide 27. The other components of the fourth example are identical to those of the optical modulator depicted in FIG. 1 or 3 and therefore, are given the same numerals used in FIGS. 1 and 3, and will not again be described.

When the length correcting units 61 and 62 are disposed under the signal electrodes 41 and 51 and each are applied with the electrical signal of the micro wave corresponding to the modulated data, a portion of the gaps between the signal electrodes 41 and 51, and the ground electrodes 43 and 52 are widened because the length correcting units 61 and 62 are curved. In this case, the impedance of the portion of the widened electrode gap is increased and reflection of the electrical signal occurs due to impedance mismatching. Therefore, the modulation band is narrowed.

In contrast, according to the optical modulator depicted in FIG. 5, the gaps between the signal electrodes 41 and 51, and the ground electrodes 43 and 52 are constant and therefore, no impedance mismatching occurs. Thus, occurrence of the reflection of the electrical signal can be suppressed and any narrowing of the modulation band can be prevented.

Figure 6:
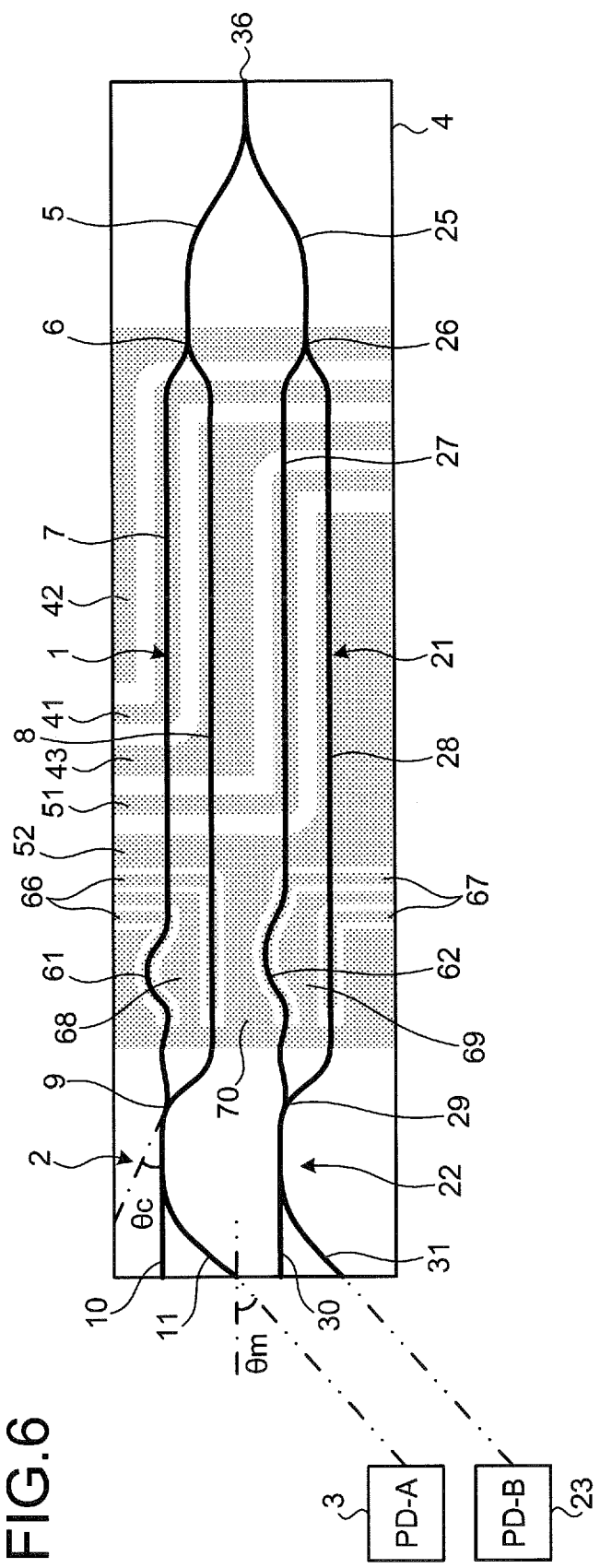
FIG. 6 is a diagram of a fifth example of the optical modulator according the embodiment.

FIG. 6 is a diagram of a fifth example of the optical modulator according the embodiment. The optical modulator depicted in FIG. 6 includes the DC electrodes 66 and 67 similar to the fourth example depicted in FIG. 5, includes the length correcting units 61 and 62 disposed under the DC electrodes 66 and 67 similar to the second example depicted in FIG. 3, and includes electrodes 68, 69, and 70 between the DC electrodes 66 and 67, in the optical modulator depicted in FIG. 1.

As depicted in FIG. 6, the electrode 68 may be disposed providing a gap from the first DC electrode 66, between a portion disposed on the first parallel waveguide 7 and another portion disposed on the second parallel waveguide 8, of the first DC electrode 66. The electrode 69 may be disposed providing a gap from the second DC electrode 67, between a portion disposed on the third parallel waveguide 27 and another portion disposed on the fourth parallel waveguide 28, of the second DC electrode 67.

The electrode 70 may be disposed providing a gap from each of the first and the second DC electrodes 66 and 67, between a portion disposed on the second parallel waveguide 8, of the first DC electrode 66 and a portion disposed on the third parallel waveguide 27, of the second DC electrode 67. These electrodes 68, 69, and 70 may be connected to the ground electrode 52. The other components of the fifth example are identical to those of the optical modulator depicted in FIG. 1, 3, or 5 and therefore, are given the same numerals used in FIGS. 1, 3, and 5, and will not again be described.

When the first length correcting unit 61 is disposed under the first DC electrode 66, a portion of the gap is widened between the portion disposed on the first parallel waveguide 7 and another portion disposed on the second parallel waveguide 8, of the first DC electrode 66 because the first length correcting unit 61 is curved. Similarly widening also occurs when the second length correcting unit 62 is disposed under the second DC electrode 67. In these cases, the electric field is weakened by the widening of the gap between the electrodes, whereby the driving voltage is increased.

In contrast, according to the optical modulator depicted in FIG. 6, even when the gap between the first and the second parallel waveguides 7 and 8 and the gap between the third and the fourth parallel waveguides 27 and 28 are widened due to the length correcting units 61 and 62, the gap between the DC electrodes 66 and 67 is constant due to the presence of the electrodes 68, 69, and 70. Therefore, increases in the driving voltage can be suppressed.

To improve the extinction ratio of the monitor light, preferably, the emitted light is caused to be emitted as much as possible to remove the emitted light component in the first and the second optical couplers 9 and 29; and entrance of the emitted light component is reduced as low as possible into the first and the second branching waveguides 2 and 22 thereafter. To do this, a single mode portion may be provided in each of the waveguides between the first and the second optical couplers 9 and 29, and the first and the second branching waveguides 2 and 22.

The width of each of the waveguides in the first and the second optical couplers 9 and 29 may be wider than the width of each of the waveguides in the other portions. A wide-width waveguide tend to act in a multi-mode. The mode of light is drastically changed in the border portion through which the multi-mode portion is changed to the single-mode portion. The drastic mode change induces scattering loss and therefore, insertion loss of the device is increased.

To prevent the drastic mode change, the waveguides each may be narrowed in a tapered shape from the first and the second optical couplers 9 and 29 toward the first and the second branching waveguides 2 and 22. Alternatively, the specific refractive indexes of the waveguides may gradually be lowered from the first and the second optical couplers 9 and 29 toward the first and the second branching waveguides 2 and 22.

Figure 7:
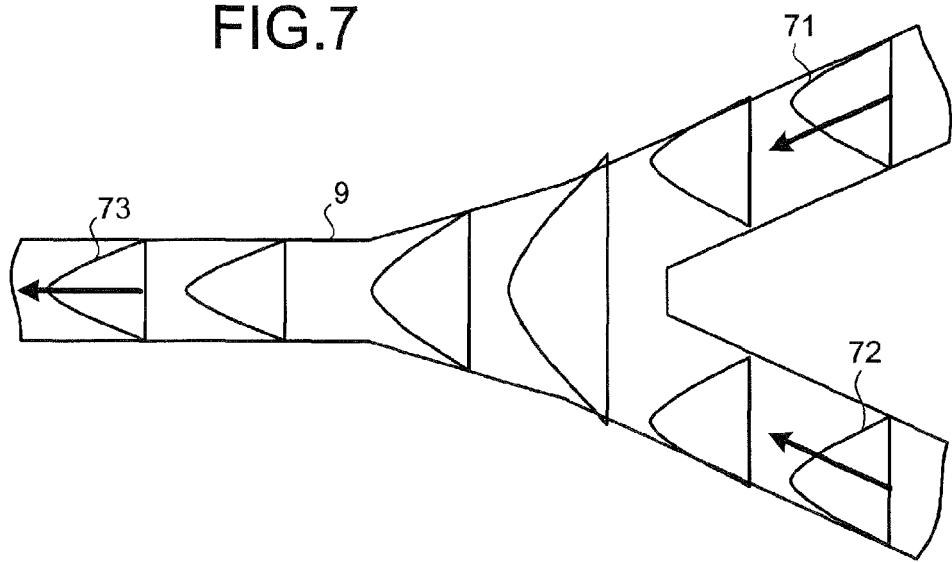
FIG. 7 is a diagram explaining propagation of light for a case where the phases of the light input into the two-input-one-output optical coupler are equal to each other.

FIG. 7 is a diagram explaining the propagation of light for a case where the phases of the light input into the two-input-one-output optical coupler are equal to each other. As depicted in FIG. 7, when light 71 and 72 input into the first optical coupler 9 each have power equal to each other and each have a phase equal to each other, all the outputs of the first optical coupler 9 are coupled to each other in a basic mode and are output from the first optical coupler 9 as basic mode light 73. In FIG. 7, arrows indicate the directions for the light to travel. The same is applied to the second optical coupler 29.

Figure 8:
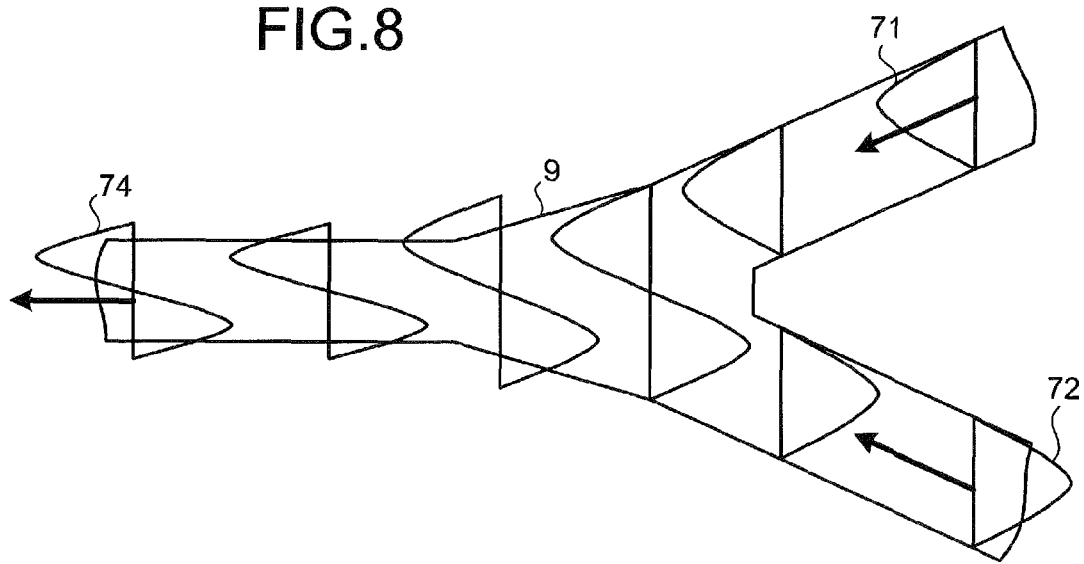
FIG. 8 is a diagram explaining propagation of light for a case where the phases of the light input into the two-input-one-output optical coupler differ by 180 degrees.

FIG. 8 is a diagram explaining the propagation of the light for a case where the phases of the light input into the two-input-one-output optical coupler differ by 180 degrees. As depicted in FIG. 8, when the power of the light 71 and 72 input into the first optical coupler 9 is the same and the phases of the light differ by 180 degrees, the output of the first optical coupler 9 is coupled in a high order mode such as a primary order mode. When the light output from the first optical coupler 9 is propagated in a multi-mode waveguide, the beam is propagated as primary mode light 74. In FIG. 8, arrows indicate the directions for the light to travel. The same is applied to the second optical coupler 29.

Although originally off-light, the primary mode light 74 depicted in FIG. 8 is a noise component. Therefore, when the primary mode light 74 reaches the first branching waveguide 2 and is output therefrom, optical noise is output in a state where the light is originally off, that is, the output power thereof is zero. The extinction ratio of the monitor light theoretically becomes infinite when no noise component is present. When a noise component is included in the output, the extinction ratio of the monitor light is a finite value corresponding to the power of the noise component and the output is degraded.

Figure 9:
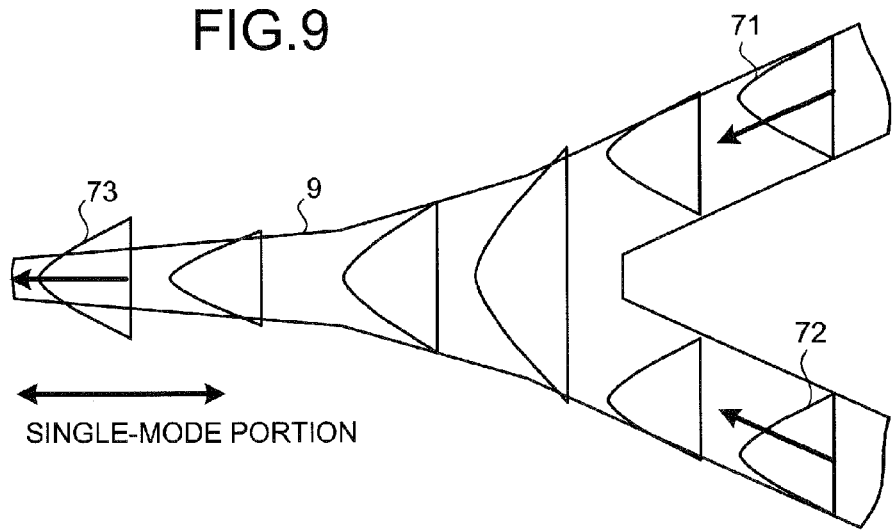
FIG. 9 is a diagram explaining propagation of light in a single mode portion for a case where the phases of the light input into the two-input-one-output optical coupler are equal to each other.
Figure 10:
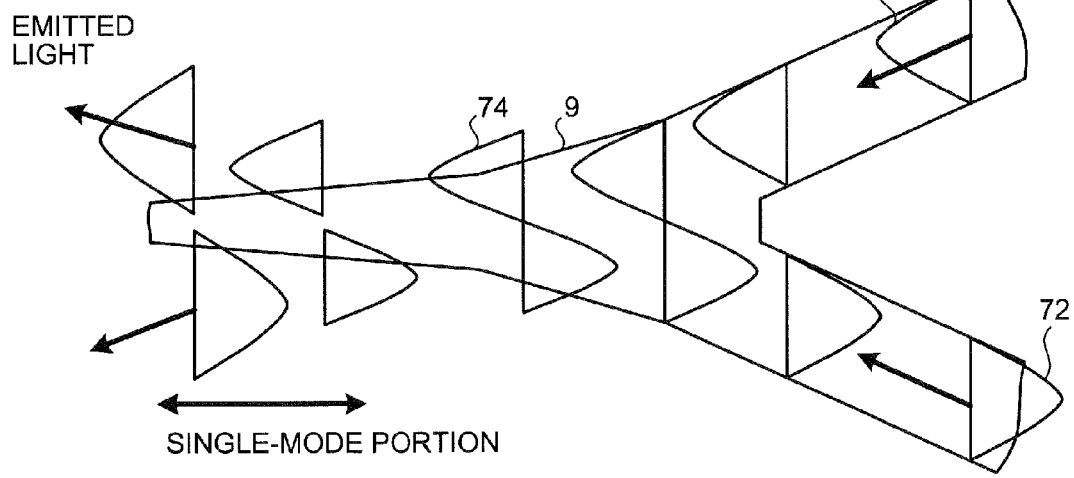
FIG. 10 is a diagram explaining propagation of light in the single mode portion for a case where the phases of the light input into the two-input-one-output optical coupler differ by 180 degrees.

As depicted in FIGS. 9 and 10, when the waveguide is narrowed in a tapered shape from the first optical coupler 9 toward the first branching waveguide 2, the single mode is established in the waveguide at the portion whose width is narrow. The same occurs when the specific refractive index of the waveguide is gradually lowered from the first optical coupler 9 toward the first branching waveguide 2 and the single mode is established in the portion having a low specific refractive index. The same occurs in the second optical coupler 29.

FIG. 9 is a diagram explaining the propagation of the light in the single mode portion for a case where the phases of the light input into the two-input-one-output optical coupler are equal to each other. As depicted in FIG. 9, the basic mode light beam 73 is propagated in the single mode portion of the waveguide, whose width is narrowed in the tapered shape. In FIG. 9, arrows indicate the directions for the light to travel.

FIG. 10 is a diagram explaining the propagation of light in the single mode portion for a case where the phases of the light input into the two-input-one-output optical coupler differ by 180 degrees. As depicted in FIG. 10, the primary mode light 74 cannot be propagated through the single mode portion whose waveguide width is narrowed in the tapered shape and is emitted as the emitted light. Thereby, the primary mode light 74 is not input into the first branching waveguide 2 and the modulated light A and the monitor light A output from the first branching waveguide 2 do not include any noise. Therefore, the extinction ratio of the monitor light is improved.

Therefore, in the optical modulator depicted in FIG. 1, 3, 4, or 5, the single mode portion may be present in each of the waveguides between the first and the second optical couplers 9 and 29, and the first and the second branching waveguides 2 and 22. Thereby, entrance of any noise component can be prevented into the first and the second branching waveguides 2 and 22, whereby the extinction ratio of the monitor light is improved.

The single mode portion of each of the waveguides may be formed by narrowing the waveguides each in the tapered shape from the first and second optical couplers 9 and 29 toward the first and second branching waveguides 2 and 22, or by gradually lowering the specific refractive index of each of the waveguides. Thereby, drastic changes of the mode of the light in the border portion through which the multi-mode portion is changed to the single-mode portion can be prevented. Therefore, scattering loss can be suppressed and increases of the insertion loss of the device can be prevented.

Figure 11:
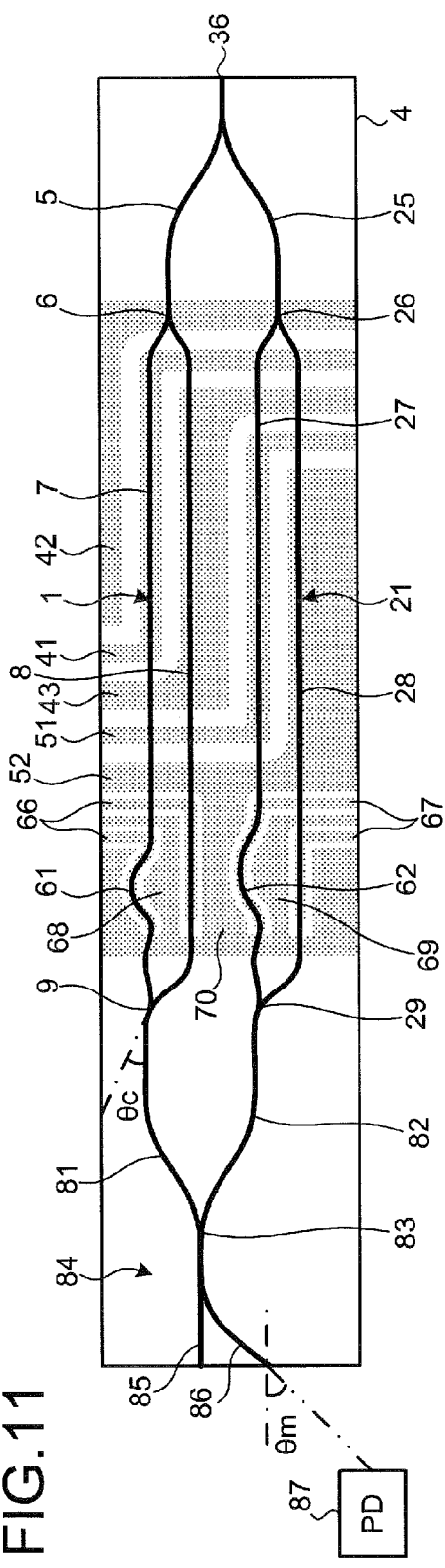
FIG. 11 is a diagram of a sixth example of the optical modulator according to the embodiment.

FIG. 11 is a diagram of a sixth example of the optical modulator according to the embodiment. The optical modulator depicted in FIG. 11 generates a differential quadrature phase shift keying (DQPSK) signal by adjusting the phases of the output light of the first and the second optical couplers 9 and 29 for the phases to differ by 90 degrees and coupling the output light, in the optical modulator depicted in FIG. 1.

The optical modulator depicted in FIG. 11 includes the DC electrodes 66 and 67 similar to the fourth example depicted in FIG. 5; the length correcting units 61 and 62 disposed under the DC electrodes 66 and 67 similar to the second example depicted in FIG. 3; and the electrodes 68, 69, and 70 between the DC electrodes 66 and 67 similar to the fifth example depicted in FIG. 6.

As depicted in FIG. 11, the output end of the first optical coupler 9 is connected to a first output waveguide 81 instead of the first branching waveguide 2 in the first example depicted in FIG. 1; and the output end of the second optical coupler 29 is connected to a second output waveguide 82 instead of the second branching waveguide 22 in the first example depicted in FIG. 1.

An output end of the first output waveguide 81 is connected to one input end of a two-input-one-output third optical coupler 83. An output end of the second output waveguide 82 is connected to the other input end of the third optical coupler 83. An output end of the third optical coupler 83 is connected to the third branching waveguide 84. It is assumed that the output ratio of the light output from the third branching waveguide 84 is a:[1−a]. "a" is a positive real number less than 0.5.

A waveguide 85 whose output ratio value is [1−a] of the third branching waveguide 84 (hereinafter, referred to as "third [1−a] output waveguide 85") may extend in, for example, the same direction as those of the first and the second parallel waveguides 7 and 8. The third [1−a] output waveguide 85 may extend to an end of the substrate 4 such as, for example, the left end as depicted in FIG. 11.

A waveguide 86 whose output ratio value is "a" of the third branching waveguide 84 (hereinafter, referred to as "third [a] output waveguide 86") is angled to be oblique with respect to the first and the second parallel waveguides 7 and 8. In the example depicted in FIG. 11, the third [a] output waveguide 86 is angled toward the lower long side of the substrate 4 as depicted in FIG. 11 and with respect to the first and the second parallel waveguides 7 and 8, forms an angle "θm" that is greater than zero.

The third [a] output waveguide 86 and the output ends of the first and the second optical couplers 9 and 29, are angled toward opposite sides, to be oblique to the first and the second parallel waveguides 7 and 8. The third [a] output waveguide 86 may extend to an end of the substrate 4 such as, for example, the left end as depicted in FIG. 11.

A third light receiving unit 87 is disposed at a position at which the third light receiving unit 87 is able to receive the light emitted from the third [a] output waveguide 86, that is, a position on an extended line of the third [a] output waveguide 86. The photodiode is an example of the third light receiving unit 87. In this embodiment, the third light receiving unit 87 is the photodiode and is denoted by "PD" in FIG. 11. The other components of the sixth example are identical to those of the optical modulator depicted in FIGS. 1, 3, 5, and 6; are given the same numerals used in FIGS. 1, 3, 5, and 6; and will not again be described.

Figure 12:
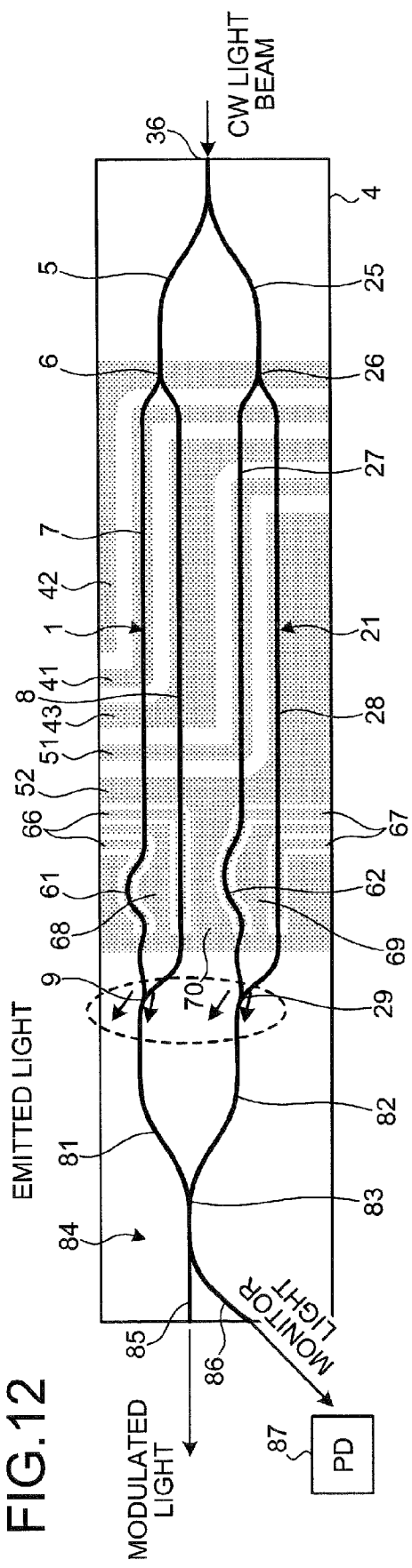
FIG. 12 is a diagram of the state of the propagation of light in the optical modulator depicted in FIG. 11.

FIG. 12 is a diagram of the state of the propagation of light in the optical modulator depicted in FIG. 11. In FIG. 12, arrows indicate the directions in which the light travels. The flow from the input of the CW light into the input end of the input optical branch 36 to the coupling (by the first optical coupler 9) of the light propagated in the first and the second parallel waveguides 7 and 8 and to the coupling (by the second optical coupler 29) of the light propagated in the third and the fourth parallel waveguides 27 and 28 is same as that described with reference to FIG. 2 in the first example of the optical modulator and will not again be described.

Modulated light whose optical intensity has been modulated by the Mach-Zehnder interference in the first Mach-Zehnder optical waveguide 1 is output from the first optical coupler 9. Other modulated light whose optical intensity has been modulated by the Mach-Zehnder interference in the second Mach-Zehnder optical waveguide 21 is output from the second optical coupler 29. The first and the second optical couplers 9 and 29 each emit the emitted light.

The modulated light output from the first optical coupler 9 is propagated in the first output waveguide 81, and at the third optical coupler 83, is coupled with the modulated light that is output from the second optical coupler 29 and propagated by the second output waveguide 82. The phases differ from each other by 90 degrees between the modulated light input from the first output waveguide 81 into the third optical coupler 83 and the modulated light input from the second optical coupler 29 into the third optical coupler 83.

The modulated light output from the third optical coupler 83 is output from the third [1−a] output waveguide 85 of the third branching waveguide 84. A portion of the modulated light is branched by the third branching waveguide 84 and is output from the third [a] output waveguide 86 as monitor light. The monitor light is received by the third light receiving unit 87.

According to the optical modulator depicted in FIG. 11, the third [a] output waveguide 86 and the output ends of the first and the second optical couplers 9 and 29 are angled toward opposite sides and thereby, the amount of light that is emitted from the first and the second optical couplers 9 and 29 and that enters the third light receiving unit 87 is reduced. Therefore, in a DQPSK optical modulator using the two-input-one-output first and the two-input-one-output second optical couplers 9 and 29, the extinction ratio of the monitor light may be improved and an excellent extinction ratio of the monitor light may be achieved.

For the optical modulators depicted in FIGS. 1, 3, 4, 5, and 6, the phases of the modulated light output from the first and the second Mach-Zehnder optical waveguides 1 and 21, respectively, may be adjusted to differ from each other by 90 degrees and the modulated light may be coupled as in the sixth example depicted in FIG. 11. When the emitted light is emitted from the third optical coupler 83, the orientation of the output end of the third optical coupler 83 may be angled toward the upper long side of the substrate 4 as depicted in FIG. 11, forming with respect the first and the second parallel waveguides 7 and 8, an angle "θc" that is greater than zero. When the output end of the third optical coupler 83 is inclined, a length correcting unit may be disposed in the first output waveguide 81.

FIG. 13 is a diagram of an example of an optical transmitter according to the embodiment. As depicted in FIG. 13, an optical transmitter 101 includes an optical modulator 102, a light emitting element 103, a data generating circuit 104, and a driver 105.

The light emitting element 103 emits light. A laser diode (LD) is an example of the light emitting element 103. The data generating circuit 104 generates modulated data. The driver 105 generates an electrical signal having an amplitude that corresponds to the modulated data output from the data generating circuit 104. The optical modulator 102 modulates the light emitted from the light emitting element 103, based on the electrical signal output from the driver 105. The optical modulators depicted in FIGS. 1, 3 to 6, and 11 are examples of the optical modulator 102 of the optical transmitter 101. The light output from the optical modulator 102 may be output to an optical fiber 106 through a connector (not depicted).

According to the optical transmitter depicted in FIG. 13, the extinction ratio of the monitor light can be improved and an excellent extinction ratio of the monitor light can be achieved by using the optical modulator depicted in any one of FIGS. 1, 3 to 6, and 11 as the optical modulator 102.

The optical modulator depicted in any one of FIGS. 1, 3 to 6, and 11 includes the two Mach-Zehnder optical waveguides. However, the same can be applied to an optical modulator that includes three or more Mach-Zehnder optical waveguides.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An optical modulator comprising:
a Mach-Zehnder optical waveguide that includes:
a pair of parallel waveguides, and
a two-input-one-output optical coupler that couples light output from the parallel waveguides;
a branching waveguide that branches a portion of light output from the optical coupler; and
a light receiving unit that receives the light output from the branching waveguide, wherein
orientation of an output end of the branching waveguide is angled toward the light receiving unit, to be oblique with respect to the parallel waveguides, and
orientation of an output end of the optical coupler is angled toward a side opposite to that of the output end of the branching waveguide, to be oblique with respect to the parallel waveguides, wherein
one waveguide of the parallel waveguides includes a length correcting unit that corrects a length of the one waveguide,
the length correcting unit is disposed under electrodes,
the electrodes are electrodes that apply bias voltage to the parallel waveguides, and
a ground electrode is disposed between the electrodes that apply the bias voltage to the parallel waveguides.

2. An optical modulator comprising:
a Mach-Zehnder optical waveguide that includes:
a pair of parallel waveguides, and
a two-input-one-output optical coupler that couples light output from the parallel waveguides;
a branching waveguide that branches a portion of light output from the optical coupler; and
a light receiving unit that receives the light output from the branching waveguide, wherein
orientation of an output end of the branching waveguide is angled toward the light receiving unit, to be oblique with respect to the parallel waveguides, and
orientation of an output end of the optical coupler is angled toward a side opposite to that of the output end of the branching waveguide, to be oblique with respect to the parallel waveguides, wherein
a waveguide between the optical coupler and the branching waveguide includes a single-mode portion, and
a specific refractive index of the waveguide gradually decreases from the optical coupler toward the branching waveguide.

3. The optical modulator according to claim 2, wherein the waveguide narrows in a tapered shape from the optical coupler toward the branching waveguide.

4. An optical transmitter comprising:
a light emitting element that emits light;
a data generating circuit that generates modulated data;
a driver that generates an electrical signal corresponding to the modulated data output from the data generating circuit; and
an optical modulator that based on the electrical signal output from the driver, modulates the light emitted from the light emitting element, wherein
the optical modulator includes:
a Mach-Zehnder optical waveguide that includes:
a pair of parallel waveguides; and
a two-input-one-output optical coupler that couples light output from the parallel waveguides;
a branching waveguide that branches a portion of light output from the optical coupler; and
a light receiving unit that receives the light output from the branching waveguide, wherein
orientation of an output end of the branching waveguide is angled toward the light receiving unit, to be oblique with respect to the parallel waveguides, and
orientation of an output end of the optical coupler is angled toward a side opposite to that of the output end of the branching waveguide, to be oblique with respect to the parallel waveguides, wherein
one waveguide of the parallel waveguides includes a length correcting unit that corrects a length of the one waveguide,
the length correcting unit is disposed under electrodes,
the electrodes are electrodes that apply bias voltage to the parallel waveguides, and
a ground electrode is disposed between the electrodes that apply the bias voltage to the parallel waveguides.

5. An optical transmitter comprising:
a light emitting element that emits light;
a data generating circuit that generates modulated data;
a driver that generates an electrical signal corresponding to the modulated data output from the data generating circuit; and
an optical modulator that based on the electrical signal output from the driver, modulates the light emitted from the light emitting element, wherein
the optical modulator includes:
a Mach-Zehnder optical waveguide that includes:
a pair of parallel waveguides; and
a two-input-one-output optical coupler that couples light output from the parallel waveguides;
a branching waveguide that branches a portion of light output from the optical coupler; and
a light receiving unit that receives the light output from the branching waveguide, wherein
orientation of an output end of the branching waveguide is angled toward the light receiving unit, to be oblique with respect to the parallel waveguides, and
orientation of an output end of the optical coupler is angled toward a side opposite to that of the output end of the branching waveguide, to be oblique with respect to the parallel waveguides, wherein
a waveguide between the optical coupler and the branching waveguide includes a single-mode portion, and
a specific refractive index of the waveguide gradually decreases from the optical coupler toward the branching waveguide.

6. The optical transmitter according to claim 5, wherein the waveguide narrows in a tapered shape from the optical coupler toward the branching waveguide.

* * * * *